US005519624A

United States Patent [19]

Hidding

[11] Patent Number: 5,519,624

[45] Date of Patent: May 21, 1996

[54] METHOD AND SYSTEM FOR PREPARING ITEMS TO BE MAILED

[75] Inventor: Gerhard Hidding, De Heerenveen, Netherlands

[73] Assignee: Hadewe B.V., BX Drachten, Netherlands

[21] Appl. No.: 305,836

[22] Filed: Sep. 14, 1994

[30] Foreign Application Priority Data

Sep. 15, 1993 [NL] Netherlands .......................... 9301598

[51] Int. Cl.[6] .............................................. G06F 19/00

[52] U.S. Cl. ............................ 364/478; 235/375; 270/58

[58] Field of Search .............................. 364/478, 464.02, 364/464.03; 209/583, 584, 3.3, 900; 270/1.1, 4, 5, 54, 58; 235/375; 101/2

[56] References Cited

U.S. PATENT DOCUMENTS

| | | | |
|---|---|---|---|
| 3,606,728 | 9/1971 | Sather et al. | 270/58 |
| 4,796,196 | 1/1989 | Durst, Jr. et al. | 364/478 |
| 4,797,832 | 1/1989 | Axelrod et al. | 364/478 |
| 4,800,505 | 1/1989 | Axelrod et al. | 364/478 |
| 5,060,165 | 10/1991 | Schumacher et al. | 364/478 |
| 5,283,752 | 2/1994 | Gombault et al. | 364/478 |
| 5,317,654 | 5/1994 | Perry et al. | 364/478 X |
| 5,325,303 | 6/1994 | Walz et al. | 364/464.02 |

FOREIGN PATENT DOCUMENTS

| | | |
|---|---|---|
| 0173996 | 3/1986 | European Pat. Off. . |
| 0447179 | 9/1991 | European Pat. Off. . |
| 0447581 | 9/1991 | European Pat. Off. . |
| 0556922 | 2/1992 | European Pat. Off. . |

*Primary Examiner*—Joseph Ruggiero
*Attorney, Agent, or Firm*—Burns, Doane, Swecker & Mathis

[57] ABSTRACT

For the preparation of items to be mailed, a number of main documents are fed. Printing instructions for the printing of a number of enclosure documents are stored in a memory, each in association with a corresponding enclosure code. In at least some of the processing instructions, at least an enclosure code is included. In reaction to an enclosure code forming part of processing instructions associated with a supplied main document, printing instructions stored in the memory in association with a corresponding enclosure code are selected and fed to a printer. An enclosure document is printed by the printer in accordance with the selected printing instructions and added to the main document. By printing the enclosures in reaction to enclosure codes associated with the main documents, a wide variety of enclosures can be incorporated into items to be mailed without logistic problems.

16 Claims, 2 Drawing Sheets

METHOD AND SYSTEM FOR PREPARING ITEMS TO BE MAILED

BACKGROUND OF THE INVENTION

This invention relates to a method of preparing items to be mailed, comprising the steps of individually feeding main documents; supplying processing instructions in association with each of the main documents to a control unit; and feeding selected enclosure documents to each of the main documents in reaction to supplied processing instructions associated with respective ones of the documents.

Such a method is disclosed in U.S. Pat. No. 3,606,728. In this method, stocks of each enclosure are each loaded into a separate feeder station. The enclosure codes associated with a document each refer to a particular feeder station. In response to enclosure codes associated with a particular main document being fed, the feeder stations are selectively activated or driven to feed an enclosure document at such a time that this enclosure document is added to the main document.

Because in this prior art method the enclosure documents are printed before the preparation of the items to be mailed is carried out, it has to be known for the purpose of printing the enclosure documents how many copies of each enclosure document are required during a particular period of operation or within the framework of a particular mailing action. In practice, it has been found that this is often difficult to foresee, as a result of which shortages occur regularly and excess enclosure documents are regularly destroyed. It need not be explained that this entails not only considerable costs but also a waste of raw materials and energy as well as a considerable environmental problem.

Also when loading the feeder stations, due account must be taken of the required numbers of each enclosure document during a particular run. Further, coordination is required in order to ensure that the enclosure documents are loaded into the correct feeder stations. This, however, can easily give rise to errors and misunderstandings, for instance between a mailing coordination department and a mailroom. When in drawing up the code associated with a main document the assumption was, for instance, that an enclosure document "A" is stored in feeder station No. 1, the enclosure code "1" will be added to main documents to which enclosure "A" is to be added. If other enclosures, for instance enclosures "C", have been loaded into feeder station No. 1, enclosure "C" will be added to the main documents to which enclosure "A" should be added.

A further drawback of this prior art method is that if a large variety of possible enclosures is desired, a large number of feeder stations are required, which feeder stations moreover have to be loaded and operated.

Applicant's commonly owned U.S. patent application Ser. No. 08/019,431, filed Feb. 18, 1993, discloses a method whereby enclosure codes associated with a main document refer directly to the enclosures in question. In this method, however, it should first be determined which enclosures have been loaded into which feeder stations, before the preparation of the items to be mailed can be started. Further, although in the system proposed in that application the feeder stations are of more compact and simpler design than is generally the case with systems for carrying out the method described hereinbefore, it still suffers from the inherent drawback that if a large variety of enclosure documents which are to be fed in random order is desired, a correspondingly large number of enclosure stations are required.

From U.S. Pat. No. 4,800,505 it is known to print a classification designation associated with the main document on mail items which are to be returned to the sender (for instance a reply envelope).

In this method the printing instructions for printing this classification designation are part of processing instructions associated with a particular document. As a result, these processing instructions are relatively extensive and a large amount of information must be generated and transferred for each main document. According as the printing instructions are more extensive, this drawback plays a larger role.

The drawback that extensive processing information must be printed on the main document each time, is obviated in this prior art method by printing an identification code, rather than the processing instructions, on the main document, storing the processing instructions (including the printing instructions) in a memory in association with the identification code printed on that particular associated main document and supplying the processing instructions to the control unit when the identification code in question has been read from a main document supplied. This, however, complicates the preparation of items to be mailed considerably and requires a large memory, because for each main document the associated printing instructions are stored separately in the memory before starting the processing of a series of main documents.

SUMMARY OF THE INVENTION

The object of the invention is to provide a method by which in a simple, mechanized manner postal items with a large variety of enclosure documents of diverse extent can be prepared in a random order.

According to the present invention, this object is realized by the steps of storing printing instructions for printing enclosure documents and associated enclosure codes in a memory; including enclosure codes in at least some of the processing instructions; selecting stored printing instructions associated with enclosure codes in reaction to corresponding enclosure codes included in the supplied processing instructions; supplying the selected printing instructions to at least one printer; controlling the at least one printer for printing enclosure documents in accordance with the supplied selected printing instructions; and feeding each of the printed enclosure documents from the at least one printer to the respective ones of the main documents, wherein printed enclosure documents to be fed to each of the main documents are maintained separate from printed enclosure documents to be fed to the other ones of the main documents.

When using the method according to the invention, enclosures are not printed until such is indicated by enclosure codes of processing instructions associated with a main document which has been fed or is to be fed later on. Accordingly, the enclosures are printed piece by piece on the basis of the immediate demand. As a consequence, stock management problems are limited to the management of the paper stock and a considerably wider variety of enclosures can be mailed, without this leading to an increase of stocks and discrepancies between required numbers and available numbers of enclosure documents.

Further, it is possible to update the contents of enclosures without having to take existing stocks into consideration.

The waste of paper can thus be counteracted without cutting down on the variety of enclosures.

In the method according to the invention, it is moreover possible to add a wider variety of enclosures to main documents without having to use a larger number of feeder stations or to process the main documents in shorter runs requiring that between the runs one or more feeder stations be filled with enclosure documents of a different type.

By virtue of the possibility of adding a large number of different enclosures, many options become available.

It is for instance possible to send adapted enclosures to visually handicapped persons; insurance policies can be custom-printed without requiring the addition of policy sheets listing provisions of which only a few are applicable; offers can be adjusted to the developments in sales with a shortened delay and be mailed to selected buyers.

Another possibility is the inclusion in the processing instructions each associated with a main document, of codes regarding the enclosures to be included, which codes can refer directly to the enclosures in question and result in the printing of enclosures in accordance with the printing instructions corresponding with those enclosure codes. Coordination with respect to the feeder stations into which enclosures are loaded is therefore not necessary. In addition, the method according to the invention precludes the possibility of an incorrect document being added to a main document owing to enclosures being loaded into a different feeder station than was envisaged or has been entered in the control unit.

The invention may further be embodied in a system adapted for carrying out the invention. This system includes a station for feeding main documents, at least one feeder station for feeding enclosure documents, which feeder station is equipped with a printer, conveyors for bringing together a main document and enclosure documents fed from the at least one feeder station, a control unit coupled to the printer and comprising a memory for storing a data base comprising printing instructions for printing enclosure documents and enclosure codes each associated with particular ones of the printing instructions, means for supplying processing instructions associated with a main document to the control unit, the control unit being adapted for selecting printing instructions associated with corresponding ones of the enclosure codes in reaction to enclosure codes included in received processing instructions and transmitting the selected printing instructions to the at least one printer.

In spite of the fact that in that system at least one of the feeder stations for feeding enclosures should be equipped with a printer, a system according to the invention can generally be manufactured at lower cost than a comparable known system with a larger number of enclosure feeders. What plays a role here is that feeder stations are made in much smaller numbers than printers such as laser printers and ink jet printers. Partly as a result of this, a printer of a current type is generally considerably cheaper than a feeder station to be selectively actuated.

DESCRIPTION OF PARTICULAR EMBODIMENTS OF THE INVENTION

Figure 1:
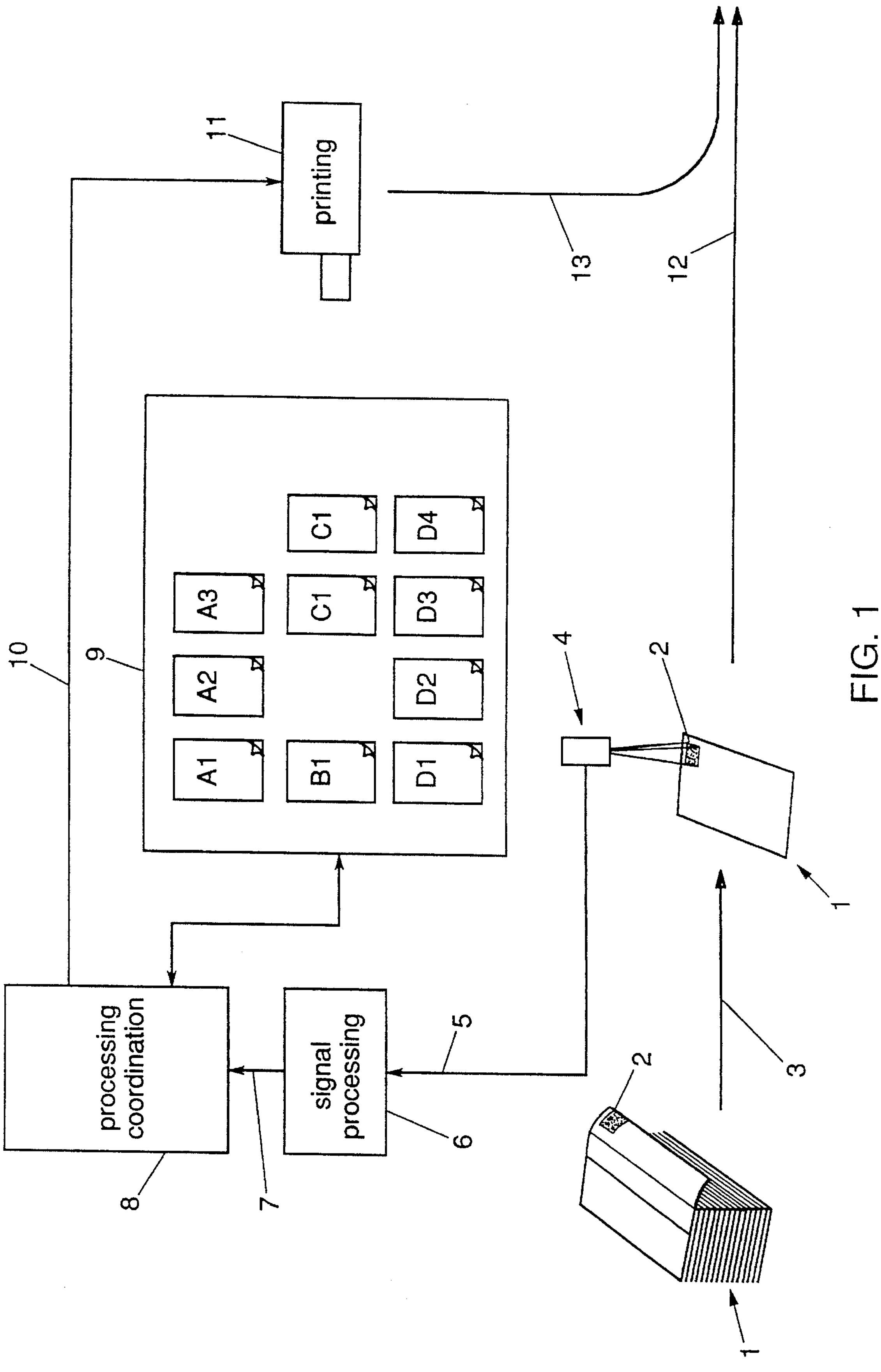
FIG. 1 is a diagrammatic representation of an example of the method according to the invention.

In the method according to the most preferred embodiment as shown in FIG. 1, the starting point is preprinted main documents on which processing instructions are represented in the form of a barcode 2. Arrow 3 represents the separate transportation of the main documents 1 to a position where the barcode is optically scanned, which operation is represented by the image generally designated by reference character 4. The scanned signals are transmitted as is indicated by the arrow 5, processed as is represented by the block 6 and transmitted as is represented by the arrow 7 for use in the coordination of the processing of the main document 1 in question (block 8).

Prior to the feeding of the first of the main documents 1 of a particular run, a data base 9 has been compiled, storing inter alia mutually different printing instructions A1, A2, A3, B1, C1, C2, D1, D2, D3, and D4 for printing enclosure documents with enclosure codes A–D, the number added to the enclosure codes in each case indicating the page number of the enclosure in question. In practice, of course, printing instructions for printing more than four different enclosure documents will be stored. The printing instructions are stored each in association with an enclosure code A–D, in that the name given to the printing instructions in question contains the relevant enclosure code.

The coordination of the processing of each main document 1 comprises the selection of printing instructions from the data base 9 in accordance with enclosure codes forming part of the processing instructions obtained by the signal processing. The processing instructions can, of course, contain other codes as well, for instance, regarding whether or not the main document and any enclosure documents are to be folded, feeding preprinted enclosure documents in known manner, the choice of a type of envelope in which the documents are to be packaged and the printing of an address on the envelope prior or subsequent to the packaging of the documents.

The selected printing instructions are transferred as is represented by the arrow 10 for carrying out the printing as is represented by the printer 11.

The main documents 1 and the enclosure documents just printed are finally transported as is represented by the arrows 12 and 13, respectively, in such a manner that the enclosure documents printed in response to processing instructions scanned from a main document 1 are added to the main document 1 in question.

If processing signals scanned from a main document 1 contain, for instance, the enclosure codes A and C, then, in response to those processing instructions, the printing instructions the names of which contain the letters A and C—i.e. in this case the printing instructions A1, A2, A3, C1, C2 —are transferred to the printer 11, where the enclosure documents A and C are printed and transported from the printer at such a time that they are added to the main document. The enclosure documents associated with a particular main document are transported separately from enclosure documents associated with a different main document in order to avoid the necessity of tracing associated main documents and enclosure documents and to minimize the chance that an enclosure document is added to a wrong main document. The enclosure documents can be transported page by page, piece by piece or as a group associated with a particular main document.

The processing instructions can also be obtained in many other ways. If the main documents are fed for the purpose of preparing the item to be mailed immediately after printing, the processing instructions can, for instance, be directly transferred from a data processor which also controls the printing of the main documents to a control unit which drives the preparation of the items to be mailed, as is known per se from commonly assigned U.S. Pat. No. 5,283,752. Alternatively, the processing instructions can be stored in a data base too, for instance in association with identification codes which are each associated with a main document and can be read therefrom, as is known per se from U.S. Pat. No. 4,800,505. However, the identification can also be utilized for identifying addressees or groups of addressees, rather than for identifying main documents. The identification code can then consist of, for instance, the addressee's postal code, his name or his client number. In association with the identification codes, processing instructions are stored. These processing instructions are read and followed in reaction to a corresponding identification code associated with a document which has been fed or is yet to be fed. In this way the mailing of specific enclosures to specific addressees or groups of addressees can be managed in a simple manner. This is particularly advantageous in combination with the method according to the invention, which makes it possible in a simple manner to mail main documents with a large variety of different enclosure documents.

Coupling the processing instructions to an identification code can also be utilized for saving costs of postage and general costs of mail traffic and the like.

To that end, use can be of identification codes each corresponding with an addressee or a group of addressees. During a period preceding the supply of a main document intended for a particular addressee or group of addressees, printing instructions for printing documents to be sent to that addressee or group of addressees are stored in the above memory in association with an enclosure code and the same enclosure code is added to processing instructions associated with the identification code corresponding with that addressee or group of addressees. A main document intended for that addressee or an addressee of the group of addressees is then processed in accordance with the processing instructions associated with the identification code corresponding with that addressee or group of addressees. As a result, the documents intended for the addressee in question are automatically added to the main document as enclosures thus it is not necessary to send them separately to the addressee or group of addressees.

In this way less urgent correspondence can simply be stored until more urgent correspondence or periodic correspondence is to be mailed and then be enclosed as an enclosure with that more urgent or periodic correspondence.

In this way, banks, for instance, can automatically enclose less urgent correspondence with bank statements.

In order to avoid the repeated mailing of the same document, it is preferred that after a main document intended for a particular addressee has been fed and processed, at least an enclosure code is removed from processing instructions associated with an identification code corresponding with that addressee.

The speed of the method according to the invention can be advantageously influenced by having the enclosure documents printed by a plurality of printers. It is often more advantageous to opt for increasing the number of printers than for faster printers, because then also the amount of time lost between the printing of successive pages is limited and because for printers with a high resolution, such as laser printers and ink jet printers, and working at a speed above a particular basic level, the price of a fast printer compared with that of a slower printer is more than proportionally higher than is the speed.

In order to provide for optimum distribution of the printing of enclosure documents comprising mutually different numbers of pages over the different printers, different pages of at least one enclosure document can be printed by different printers. If, for instance, the enclosure documents C and D are to be added to a main document 1 and use is made of two printers for printing the enclosures, the pages C1, D1 and D3 can be printed by the first printer and pages C2, D2, and D4 by the second printer, the pages from the different printers being printed preferably at such times that they are fed alternately by the different printers.

According to the example of the method according to the invention as shown in FIG. 1, the printing instructions for printing each enclosure document A, C, D which comprises at least two pages are translated into printing instructions A1, A2, A3, C1, C2, D1, D2, D3, D4 for pages to be printed separately and then stored in the memory in the form of series of printing instructions for printing separate pages. In reaction to a corresponding enclosure code, the printing instructions of separate pages of the document in question can be distributed over different printers.

This way of storing and distributing the printing instructions provides the advantage that the translation of the printing instructions for a particular document, which may, for instance, have been drawn up with a generally available work processing program or desktop publishing program, need only be translated into printing instructions for separate pages a single time, i.e., when being stored in the data base 9. These printing instructions can then be distributed over the available printers for the purpose of printing the enclosure document in question in the most advantageous manner possible. The translation of the printing instructions into printing instructions for individual pages thus need not be carried out each time a particular enclosure document is printed.

The distribution of the pages of an enclosure document over different printers can also be carried out by supplying the printing instructions of an enclosure document to be printed to different printers in combination with different instructions for each printer for printing a number of the pages of the enclosure document. This manner of distributing the printing of pages over different printers will generally take slightly more time than the manner of distribution described hereinabove because each of the printers must process the complete printing instructions of the enclosure document to be printed so as to determine the printing of the pages to be printed. On the other hand, however, when this manner of distributing the pages to be printed is used, no software is required for translating printing instructions for a complete document into printing instructions for individual pages.

If the enclosures to be added to a main document comprise a plurality of identical pages—for instance, order forms—the printing instructions sent to the different printers can also consist of instructions for printing the same page, each time in combination with a command indicating how many copies of that page are to be printed.

To distribute the printing activity over the printers, it is also possible to use printers of which at least one printer prints at a greater speed than at least one other printer, to arrange selected printing instructions according to size and to send the printing instructions of the largest size to the faster printer. This manner of distributing the printing instructions over the printers provides the advantage that the selected printing instructions for printing the enclosure documents need only be sent to one printer and need not be translated into instructions for printing individual pages. A gain in speed can be obtained with this manner of distributing the printing instructions if generally enclosure documents of essentially different sizes are to be added to one and the same main document. If in each case only one enclosure document or enclosure documents of approximately the same size are to be added to a main document, this manner of distributing the printing instructions over different printers is less attractive.

In some cases, the printing of the enclosure documents can be accelerated in a simple manner by printing the enclosure documents on preprinted paper. This last is also advantageous for including colored elements and images in the enclosures without the necessity of using an adapted printer for printing those elements and images.

Further, the selected printing instructions for printing an enclosure document can be modified before being fed to the printer. This makes it possible to frequently make smaller changes in a simple manner. Uses include, for example, the inclusion in the enclosures of unique data associated with the respective addressee, for instance name and address, or data subject to change in time, for instance the date and Exchange quotations.

Figure 2:
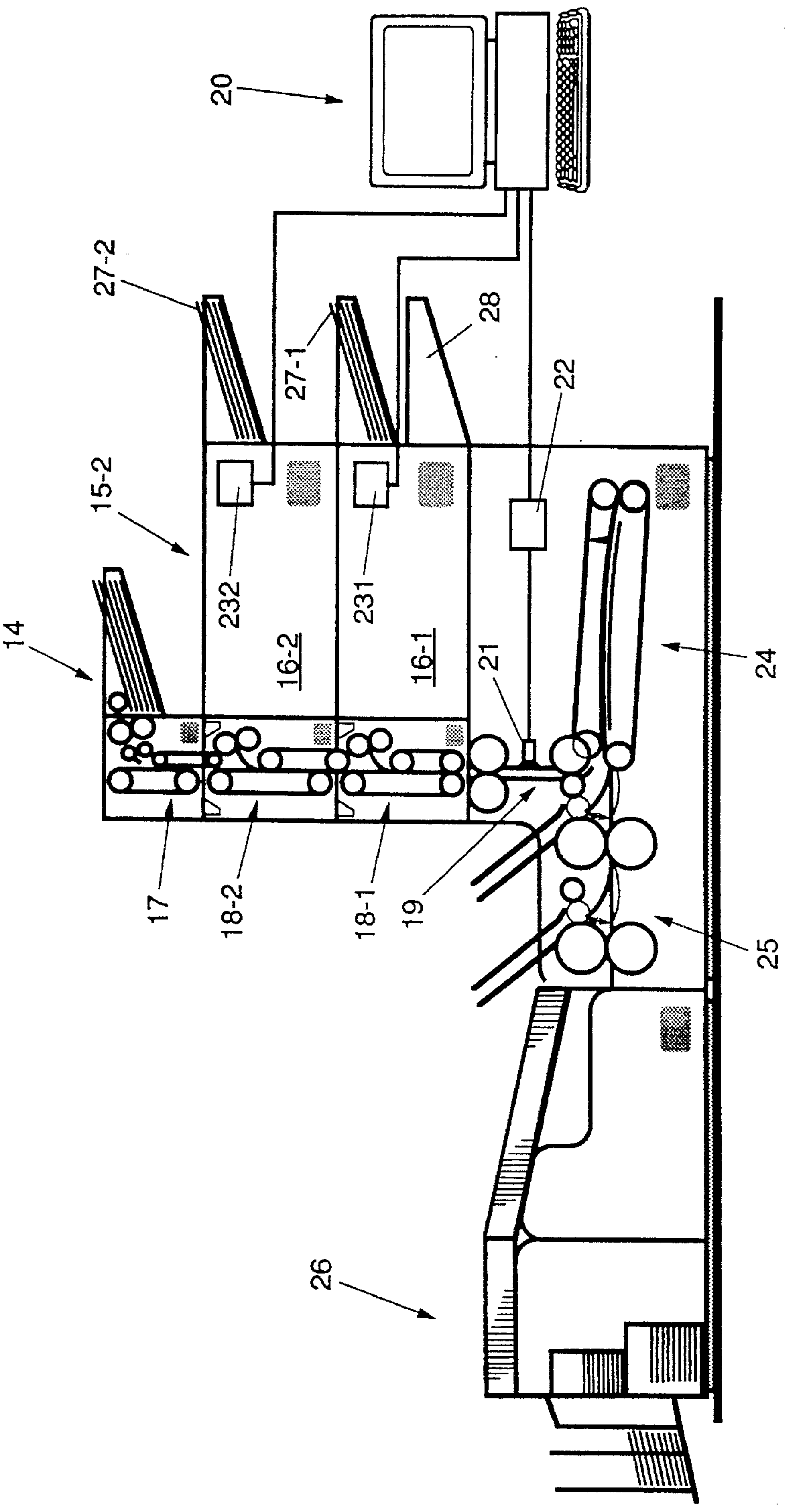
FIG. 2 is a diagrammatic representation of an example of a system according to the invention.

The example of a system for carrying out the method according to the invention as represented in FIG. 2 comprises a station 14 for feeding preprinted main documents. The station 14 is adapted for processing loose sheets but may also be adapted for processing fanfold forms. As was apparent from what has already been set out with regard to the method according to the invention, instead of the station 14, a printer for in-line printing of main documents can be used.

The system further comprises feeder station 15-1 and 15-2 for feeding enclosure documents, equipped, respectively, with a printer 16-1, 16-2, conveyors 17-1, 17-2, 18-1, 18-2, 19 for gathering a main document 1 and fed enclosure documents. A control unit coupled to the printers 16-1 and 16-2 and comprising a memory for storing a data base 9 (FIG. 1) is provided in the form of a personal computer 20 but may also, for instance, be integrated into one or more of the components for physically processing the documents. As has been described with reference to FIG. 1, the data base 9 stored in the control unit 20 comprises printing instructions for printing enclosure documents and enclosure codes each associated with particular ones of those printing instructions.

For supplying processing instructions associated with a main document 1 to the control unit 20, the system is equipped with an optical scanning unit 21 which is connected to the control unit via a unit 22 with a signal processing function.

Further, in the control unit a program is stored which, in response to processing instructions which are received via the signal processing unit 22 and contain the enclosure codes, selects printing instructions associated with corresponding ones of these enclosure codes, and which transmits the printing instructions to processors 23-1 and 23-2 incorporated in the printer. The printers 16-1 and 16-2 can be coupled to the personal computer 20 in the same manner and utilize the same interface as is conventional for a printer intended for general office uses.

The system shown further comprises a gathering station 24, a gathering station 25 and an inserter station 26. Such stations are described in more detail in applicant's European U.S. patent application Ser. No. 08/019,431, filed Feb. 18, 1993, which is incorporated herein by reference.

Because the system shown is equipped with two printers 16-1 and 16-2, it is suitable for carrying out the above-described elaboration of the method where use is made of several printers for printing enclosures. For the use of still more printers the number of feeder stations equipped with printers can be extended in simple manner by arranging a corresponding number of further feeder stations equipped with printers between the feeder station 15 and the station 14 for supplying main documents.

The system shown can also be extended, incidentally, by arranging feeder stations for feeding preprinted enclosures on top of the station 14 for supplying main documents.

By utilizing in the system a printer which is faster than at least one other of the printers and storing in the control unit 20 a program for arranging enclosure documents according to printing size and for supplying the most extensive printing instructions of printing instructions for at least two enclosure documents to the faster printer, the system can be adapted for efficiently processing items to be mailed with enclosures of different sizes, as discussed hereinbefore.

In order to extend the variety of enclosure documents that can be printed to the point where enclosures can be printed in random order on different types of paper, of different colors and/or sizes, the lower printer 16-1 for printing enclosures is provided with two selectively controllable paper inputs for which purpose two paper trays 27-1 and 28 are arranged. The upper printer is equipped with one paper tray 27-2.

Within the framework of the invention, many other embodiments are conceivable. Thus, the invention can, for instance, be used as well in a system for processing items to be mailed, in which the main document is passed on a belt along one or more enclosure feeder stations and each enclosure feeder station adds an enclosure to the main document. The invention can also be used in systems where the enclosures are folded beforehand and are gathered in the envelope, as well as in systems where the envelope is fed as a blank and is folded around the gathered documents.

I claim:

1. A method of preparing items to be mailed, comprising the steps of:

storing sets of printing instructions, each for determining the printing of a predetermined human-readable enclosure document, and enclosure codes each associated with one of said sets of printing instructions in a memory;

including enclosure codes in processing instructions associated with main documents;

individually feeding said main documents;

supplying said processing instructions to a control unit;

selecting sets of printing instructions associated with enclosure codes from said stored sets of printing instructions responsive to corresponding enclosure codes included in the processing instructions supplied to said control unit;

supplying the selected sets of printing instructions to at least one printer;

controlling said at least one printer for printing the predetermined enclosure documents in accordance with the supplied selected sets of printing instructions; and feeding each of the printed enclosure documents from said at least one printer to the respective ones of said main documents, wherein printed enclosure documents to be fed to each of said main documents are maintained separate from printed enclosure documents to be fed to other ones of the said main documents.

2. A method according to claim 1, wherein at least two printers are provided and wherein the step of controlling the at least one printer for printing the enclosure documents comprises controlling the at least two printers.

3. A method according to claim 2, wherein at least one of said printers prints at a greater speed than at least one other printer, and wherein the method comprises the steps of identifying selected printing instructions according to size and transmitting the printing instructions of the largest size to the at least one of said printers that prints at a greater speed.

4. A method according to claim 2, wherein the step of controlling the printers comprises transmitting printing instructions corresponding to different pages of at least one of the enclosure documents for printing the different pages by different printers.

5. A method according to claim 4, further comprising the steps of translating printing instructions for printing enclosure documents of at least two pages into separate printing instructions for separately printing pages of the respective enclosure documents, storing said printing instructions in said memory in the form of series of instructions for printing series of separate pages, and, responsive to a corresponding enclosure code being included in supplied processing instructions, distributing said printing instructions for printing separate pages of the enclosures documents to different printers.

6. A method according to claim 4, comprising the step of distributing printing instructions of said at least one of the enclosure documents to different printers in combination with different instructions regarding the pages to be printed.

7. A method according to claim 1, comprising the step of providing preprinted paper on which the enclosure documents are printed.

8. A method according to claim 1, comprising modifying selected printing instructions for printing at least some of the enclosure documents before said instructions are supplied to the at least one printer.

9. A method according to claim 1, further comprising the steps of compiling a data base including files containing processing instructions, each of said files being coupled with an identification code, supplying an identification code associated with a main document to the control unit and selecting one of said files associated with a corresponding one of the identification codes in reaction to the supplied identification code; the processing instructions of the selected file forming the processing instructions associated with the fed main document.

10. A method according to claim 9, wherein each identification code corresponds with at least one addressee, prior to the supply of at least one of said main documents intended for a particular one of said addressees, printing instructions for printing enclosure documents to be sent to said addressee are stored in said memory in association with an enclosure code and a corresponding enclosure code is added to the processing instructions associated with the identification code corresponding with said addressee, and a main document intended for said addressee is processed in accordance with the processing instructions associated with the identification code corresponding with said addressee.

11. A method according to claim 10, wherein after feeding and processing said at least one main document which is intended for a particular addressee, at least said enclosure code is removed from said processing instructions associated with said identification code corresponding with said addressee.

12. An apparatus for preparing items to be mailed, comprising:

a station for feeding main documents, at least one feeder station for feeding enclosure documents, said feeder station including a printer, conveyors for bringing together a main document and enclosure documents fed from said at least one feeder station, a control unit coupled to the printer and comprising a memory containing a data base for storing sets of printing instructions each for printing a predetermined human-readable enclosure document and enclosure codes each associated with a particular one of said sets of printing instructions, means for supplying processing instructions associated with a main document to the control unit, the control unit being adapted for selecting sets of printing instructions associated with selected ones of said enclosure codes responsive to enclosure codes included in received processing instructions and transmitting said selected sets of printing instructions to the at least one printer.

13. A apparatus according to claim 12, comprising at least two feeder stations for supplying enclosure documents, each feeder station being equipped with a printer.

14. A apparatus according to claim 13, wherein at least one of said printers is faster than at least one other one of said printers and the control unit is adapted for arranging printing instructions for printing said documents according to printing size and for supplying the most extensive printing instructions of printing instructions for printing at least two enclosure documents to the faster printer.

15. A method of preparing items to be mailed, comprising the steps of:

storing sets of printing instructions, each determining the printing of a predetermined human-readable enclosure document and enclosure codes each associated with one of said sets of printing instructions in a memory;

including enclosure codes in processing instructions associated with main documents;

individually feeding said main documents;

supplying said processing instructions to a control unit;

selecting sets of printing instructions associated with selected enclosure codes from said stored sets of printing instructions responsive to corresponding enclosure codes included in the processing instructions supplied to said control unit;

modifying said selected sets of printing instructions;

supplying the selected sets of printing instructions to at least one printer;

controlling said at least one printer for printing the modified predetermined enclosure documents in accordance with the supplied selected sets of printing instructions; and feeding each of the printed enclosure documents from said at least one printer to the respective ones of said main documents, wherein printed enclosure documents to be fed to each of said main documents are maintained separate from printed enclosure documents to be fed to the other ones of said main documents.

16. A method of preparing items to be mailed, comprising the steps of:

storing sets of printing instructions, each determining the printing of a predetermined human-readable enclosure document, and enclosure codes, each associated with one of said sets of printing instructions in a memory;

compiling a data base including files containing processing instructions, at least some of said processing instructions including said enclosure codes, and identification codes coupled to each of said files and each corresponding to at least one addressee;

individually feeding at least one main document intended for said at least one addressee;

supplying the identification code corresponding to said at least one addressee to a control unit;

selecting a file containing processing instructions which are coupled to the identification code corresponding to said supplied identification code;

selecting at least one set of printing instructions associated with at least one selected enclosure code from said stored sets of printing instructions responsive to corresponding enclosure codes included in the processing instructions of the selected file;

supplying the selected sets of printing instructions to at least one printer;

controlling said at least one printer for printing the predetermined enclosure documents in accordance with the supplied selected sets of printing instructions; and feeding the printed enclosure documents from said at least one printer to the at least one main document, wherein the printed enclosure documents are maintained separate from printed enclosure documents to be fed to other main documents.

* * * * *